(12) United States Patent
Disser

(10) Patent No.: US 8,328,649 B2
(45) Date of Patent: Dec. 11, 2012

(54) DISPLACEMENT UNIT AND UNIVERSAL SHAFT COMPRISING A DISPLACEMENT UNIT

(75) Inventor: Claus Disser, Seligenstadt (DE)

(73) Assignee: Shaft-Form-Engineering GmbH, Mühlheim (DE)

( * ) Notice: Subject to any disclaimer, the term of this patent is extended or adjusted under 35 U.S.C. 154(b) by 246 days.

(21) Appl. No.: 12/377,600

(22) PCT Filed: Aug. 16, 2007

(86) PCT No.: PCT/DE2007/001442
§ 371 (c)(1),
(2), (4) Date: Mar. 27, 2009

(87) PCT Pub. No.: WO2008/019668

PCT Pub. Date: Feb. 21, 2008

(65) Prior Publication Data

US 2010/0227696 A1    Sep. 9, 2010

(30) Foreign Application Priority Data

Aug. 18, 2006    (DE) .......................... 10 2006 038 697

(51) Int. Cl.
*F16C 3/035*    (2006.01)
(52) U.S. Cl. ...................................... 464/167; 464/906
(58) Field of Classification Search .................. 464/145, 464/146, 167, 906
See application file for complete search history.

(56) References Cited

U.S. PATENT DOCUMENTS

| 5,026,325 | A | 6/1991 | Welschof |
| 6,217,456 | B1 | 4/2001 | Jacob |
| 6,241,617 | B1 * | 6/2001 | Jacob .............................. 464/167 |
| 6,902,487 | B2 * | 6/2005 | Welschof ....................... 464/167 |
| 7,290,800 | B2 | 11/2007 | Schwarzbich et al. |
| 7,670,229 | B2 * | 3/2010 | Disser et al. |

(Continued)

FOREIGN PATENT DOCUMENTS

DE    19831016 A1    1/2000

(Continued)

OTHER PUBLICATIONS

Wagner, E. R., "Driveline and Driveshaft Arrangements and Constructions," Universal Joint and Driveshaft Design Manual, AE-7, Society of Automotive Engineers, Inc., Warrendale, PA, pp. 3-10, TJ1079.S62 1979.*

(Continued)

*Primary Examiner* — Gregory Binda
(74) *Attorney, Agent, or Firm* — McDonnell Boehnen Hulbert & Berghoff LLP

(57) ABSTRACT

A displacement unit comprising a tubular outer part on an inner surface of which outer paths are provided. An inner part displaceable in the tubular outer part in axial direction, on whose exterior surface inner paths are provided and a plurality of balls guided in a cage, the balls respectively located in outer and inner paths that are associated with each other in pairs. The tubular outer part and/or the inner part provided with cage guide paths between at least some of the paths for axial guiding the cage. A quantity of the cage guide paths is smaller than the quantity of pairs of paths formed by the outer and inner paths. The cage may comprise a plurality of integral guide path protrusions that engage the cage guide paths.

11 Claims, 3 Drawing Sheets

U.S. PATENT DOCUMENTS

2004/0214647 A1 10/2004 Welschof
2006/0166749 A1 7/2006 Jacob et al.
2008/0248886 A1* 10/2008 Disser et al. .............. 464/167 X

FOREIGN PATENT DOCUMENTS

| DE | 19952245 A1 | 7/2000 |
| DE | 20317344 U1 | 1/2004 |
| DE | 10237169 A1 | 3/2004 |
| JP | 2097719 | 4/1990 |

OTHER PUBLICATIONS

English Translation of the Japanese Office Action, Notification of Reasons for Rejection.

* cited by examiner

DISPLACEMENT UNIT AND UNIVERSAL SHAFT COMPRISING A DISPLACEMENT UNIT

CROSS REFERENCE TO RELATED APPLICATIONS

The present application is a 35 U.S.C. 371 National Application of PCT/DE2007/001442 filed Aug. 16, 2007 and claims priority to German Patent Application DE 10 2006 038 697.3, filed Aug. 18, 2006, the entire contents of which are incorporated entirely herein by reference.

BACKGROUND TO THE INVENTION

1. Field of the Invention

The invention concerns a displacement unit, particularly for a roller balance or a displacement joint of a universal shaft with a tubular exterior part on the interior surface of which outer paths are provided at least in sections, with an inner part that is displaceable in the outer part in axial direction, on whose exterior surface interior running paths are provided at least in sections, and with balls for the transmission of torque that are guided in a cage that are respectively located in outer paths and inner paths that are associated with each other in pairs, whereby the outer part and/or the inner part is provided with cage guide paths between at least some of the exterior paths or interior paths for axial guiding of the cage. Further, the invention concerns a universal shaft with a displacement unit of this type.

2. Description of Related Art

From DE 102 37 169 A1, a displacement joint is known of the type mentioned at the beginning. The cage guide paths are thereby designed either as centering slots in an outer part between two ball paths respectively or in an inner part as centering slot between the ball paths. Alternatively, it is also possible that the cage is designed as folding cage that has a wavy profile in cross section. In this process, the cage can project into the ball paths with cage guide pins in sections, so that the cage is guided twist-safe and displaceable in axial direction on the inner race.

To avoid distortion or tension when hardening or similar subsequent treatment of the displacement unit, it is preferred to keep the quantity of cage guide paths and run paths pairs identical, whereby the cage guide paths and the paths pairs are located evenly distributed around the circumference.

In DE 199 52 245 A1, a displacement unit that is designed as a roller balance was suggested in which the quantity of the outer paths corresponds to double or triple the quantity of the inner paths. This is said to also avoid deformations due to hardening. In these arrangements, however, the quantity of the pairs of paths in which balls are located for transmission of torque is limited.

SUMMARY OF THE INVENTION

Therefore, the problem of the invention at hand is to make a displacement unit as well as a universal shaft with a displacement unit of this type available in which, at good axial guidance of the cage, transmission of very high torque is simultaneously possible.

In accordance with the invention, this problem is essentially solved thereby, that the quantity of the cage guide paths is smaller than the quantity of the pairs of paths formed by the outer paths and the inner paths. Thereby, the invention is based on the idea that the quantity of the pairs of paths in which balls are located for transmitting torque can be selected optimally for the purpose of the respective application, while only a few cage guide paths must be provided for axial guidance of the cage. Thus the pairs of paths can be selected in size and/or quantity in such a way that a large moment of torque is transmitted, whereby only a smaller quantity of cage guide paths is provided in order to guide the cage axially. Surprisingly, it was shown that deformations around the circumference of the outer part or the inner part due to hardening can be avoided even in this uneven distribution of pairs of paths and the cage guide paths. In addition, as a result of the presence of cage guide paths in the outer part and/or the inner part, improved axial guidance of the cage is achieved.

According to a preferred embodiment of the invention, between two neighboring cage guide paths at least two outer paths or inner path are located respectively. In other words, the number of the pairs of path amounts to, for example, double or a multiple of the number of cage guide paths. It is also possible to distribute the cage guide paths unevenly over the circumference of the outer part and to provide only one or very few cage guide paths In order to avoid deformation due to hardening because of the larger circumference of the outer part compared to the inner part, it is preferred that the cage guide paths are designed in the outer part. However, it is also possible in principle to provide the cage guide in the inner part.

Preferably, the cage guide paths have contours that deviate from the outer paths and the inner paths in cross section. Thus, the cage guide paths can have a rounded contour or an angular contour in cross section. As a result of this it is possible that an inadvertent insertion of the cage into the pairs of paths, which are provided for accepting balls for torque transmission, is avoided. The contour of the cage guide paths can thereby be designed in cross section in such a way that an optimal guiding of the cage is achieved even for a small quantity of cage guide paths.

When the cage is made of plastic, it can be provided with guide protrusions that engage the cage guide paths, which are, for example, rounded or angular. For example, FIG. 5 illustrates a plastic cage arrangement with a cross hatch pattern to depict plastic material. Alternatively, it is also possible, that the cage is a formed piece of sheet metal or a piece of tube with walls that are essentially of constant thickness, whereby, (cage) guide protrusions are provided that engage with the cage guide paths. According to an additional embodiment is also possible that the cage is a folding cage with cage guide pins which do not engage with the pairs of paths but with the cage guide paths.

A roller balance according to the invention is provided with a displacement unit of the type mentioned above, whereby several balls are accepted in axial direction by the pairs of paths that are formed by the outer paths and the inner paths. A toppling of the inner part relative to the outer part is thereby essentially impossible.

In contrast, a displacement joint (plunging joint) in accordance with the invention is provided with a displacement unit of the type mentioned above, whereby only one ball is accepted respectively in axial direction in the pairs of paths formed by the outer paths and the inner paths. As a result of this, at least a little pivoting of the joint is possible during operation.

The problem on which the invention is based is solved by a universal shaft, particularly a longitudinal shaft of a vehicle or a lateral shaft which is provided with at least one roller balance or a displacement joint with a displacement unit according to the invention.

A universal shaft provided as longitudinal shaft of a vehicle is preferably designed with at least two shaft sections that are respectively provided with one flute tube that are connected with one another by a middle joint and that are provided with a joint at the side of the gear or the differential side at their ends facing away from the middle joint. Thereby, the joint that is on the gear side, the joint that is on the differential side as well as the middle joint can be designed as homocinetic fixed joints, particularly as opposed paths joints, whereby two roller balances are provided which are associated with the middle joint and which are located close to it for accepting an axial displacement path during operation or during assembly.

It is provided in the further development of this inventive idea that the inner part of the second roller balance is connected with the inner race of the middle joint and the inner part of the first roller balance with the outer race of the middle joint.

The two roller balances are thereby directly associated with the middle joint.

For mounting the universal shaft it is preferred when the inner part of a roller balance is mounted in an intermediate bearing. In particular, the inner part of the first roller balance can be mounted, for example in an intermediate bearing that is elastically hung at the bottom of the vehicle.

In the following, the invention is explained in more detail by using examples of embodiments and by referring to the drawings. In doing so, all described and/or shown characteristics by themselves or in any combination, form the subject matter of the invention, independent of its abstract in the claims or derived from them.

BRIEF DESCRIPTION OF DRAWINGS

Schematically shown are.

DETAILED DESCRIPTION

Figure 1:
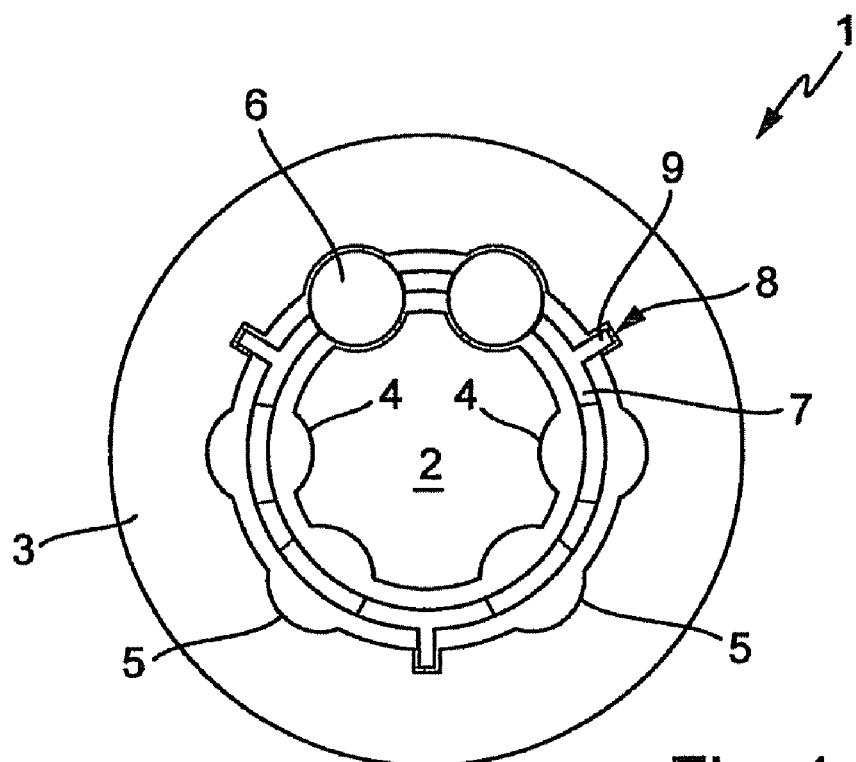
FIG. 1 A cross section through a displacement unit according to a first example of an embodiment of the invention, FIG. 2 a cross section through a displacement unit according to a second example of an embodiment of the invention, and FIG. 3 a longitudinal cross section through a universal shaft in accordance with the invention.

In the embodiment as per FIG. 1, a displacement unit 1 with an inner part 2 and outer part 3 that is coaxial to it is shown. On the outer surface of the inner part 2, six inner paths 4 are designed which extend essentially parallel to one another in axial direction. Thereby, two inner paths 4 are always arranged in pairs with respect to one another whereby between the inner pairs of paths a distance section remains on the outer surface of inner part 2, which is designed essentially cylindrical.

Correspondingly, at the inner surface of outer part 3, outer paths 5 are provided that run parallel to one another in axial direction. The outer paths 5 are also associated with one another in pairs and are distributed over the circumference of outer part 3 in such a way that respectively one outer path 5 is opposite to an inner path 4 and together with it forms a pair of paths.

In the pairs of path formed by inner paths 4 and outer paths 5 at least one ball 6 is respectively accepted for transmitting torque between inner part 2 and outer part 3. The inner part 2 is thereby displaceable in axial direction relative to the outer part 3, whereby balls 6 roll in inner paths 4 and outer paths 5.

When the displacement unit 1 is designed as a roller balance, several balls 6 are provided in every pair of paths so that inner part 2 cannot be tipped or swiveled relative to outer part 3. If, on the other hand, the displacement unit 1 is designed as a displacement joint, one ball 6 is provided in each pair of paths so that the inner part 2 can be bent at least by a small angle with respect to outer part 3.

Balls 6 are accepted in windows of cage 7 and guided in it. In the embodiment that is shown, cage 7 is guided in outer part 3 in axial direction. For this purpose, cage guide paths 8 are formed in the inner surface of outer part 3, with which cage guide protrusions 9 of cage 7 engage. In principle, the cage guide paths can, however, also be provided in the inner part.

As can be seen in FIG. 1, cage guide paths 8, which can, for example, have a rectangular cross section, are provided in the section between two pairs of paths that are associated with one another. Consequently, between two cage guide paths 8, there are always two outer paths 5. Cage guide paths 8 and outer paths 5 are thereby at least essentially evenly distributed over the circumference of outer part 3. Hereby, deformation as a result of hardening in outer part 3 can be avoided. Further, it is then also possible to design outer part 3 as a sheet metal part with walls that are essentially of constant thickness.

Figure 2:
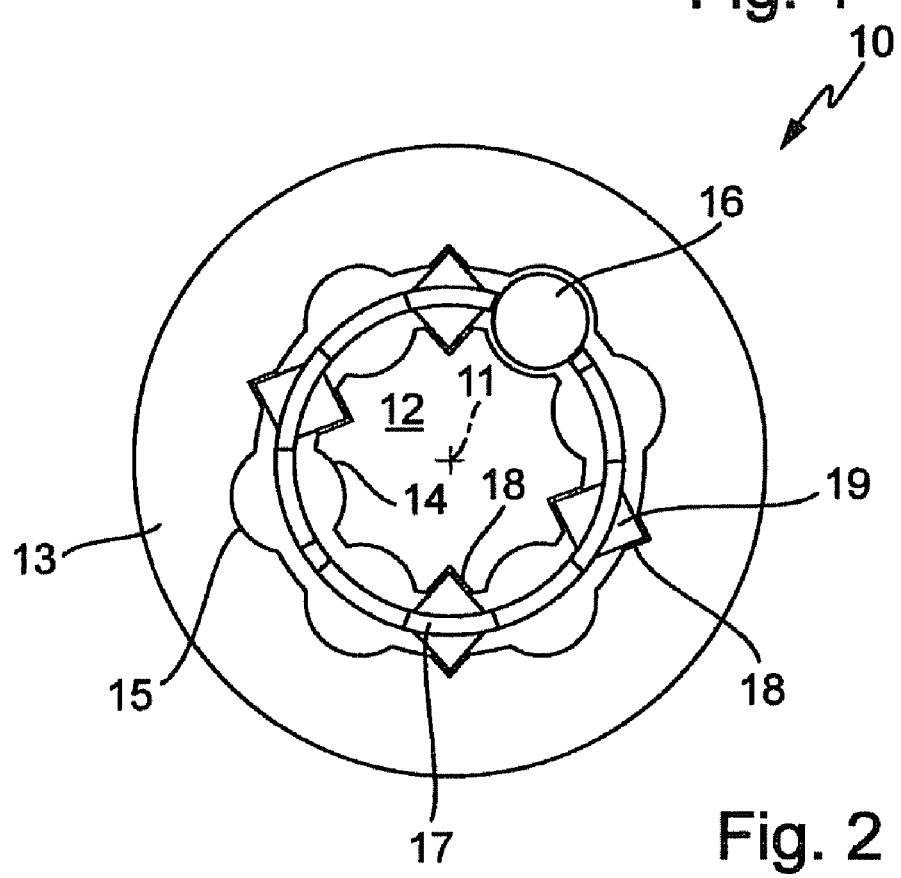

In FIG. 2, a displacement unit 10 is shown as per a second embodiment, which is also provided with an—to an axis 11—coaxial inner part 12 and hereto a coaxial outer part 13. In the inner part 12 there are provided in turn, inner paths 14 and in outer part 13 outer paths 15 that are associated with one another and that form pairs of paths. In each pair of paths at least one ball 16 is accepted which is guided in a cage 17.

Displacement unit 10 is designed with six pairs of paths and four cage guide path in outer part 13, deviating from the representation of the embodiment as per FIG. 1. Additionally, cage guide paths are also formed in inner part 12.

Figure 4:
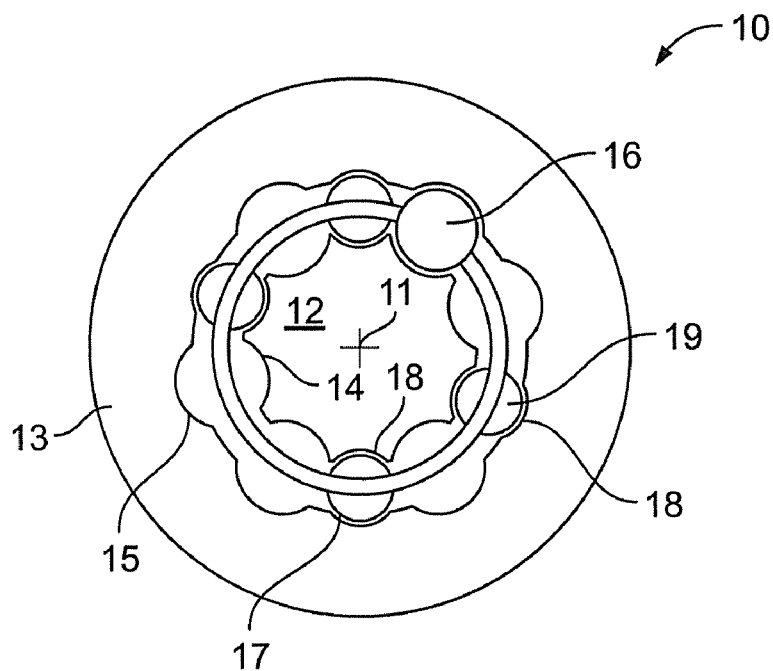
FIG. 4 a cross section through a displacement unit according to a third example of an embodiment of the invention, FIG. 5 a cross section through a displacement unit according to a fourth example of an embodiment of the invention.

Thereby the pairs of paths that are formed by inner paths 14 and outer paths 15 are arranged alternately individual and associated with each other in pairs around the circumference of axis 11. Cage 17 is guided in cage guide paths 18, with which cage guide protrusions 19 engage. Cage guide protrusions 19 and cage guide paths 18 are thereby designed triangular in cross section in the embodiment as per FIG. 2. In principle, the cage guide paths and the cage guide protrusions can, however, be provided with suitable contours and can be, for example, rounded or the like. For example, FIG. 4 illustrates a cage path arrangement comprising rounded contours.

Figure 5:
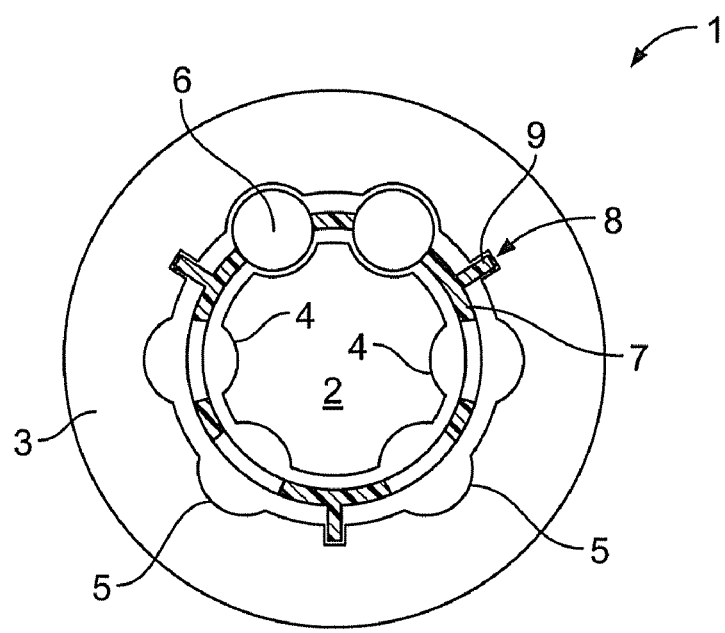

When the cage is made of plastic, it can be provided with guide protrusions that engage the cage guide paths, which are, for example, rounded or angular. For example, FIG. 5 illustrates a plastic cage arrangement with a cross hatch pattern to depict plastic material. Alternatively, it is also possible, that the cage is a formed piece of sheet metal or a piece of tube with walls that are essentially of constant thickness, whereby, (cage) guide protrusions are provided that engage with the cage guide paths. According to an additional embodiment is also possible that the cage is a folding cage with cage guide pins which do not engage with the pairs of paths but with the cage guide paths.

Further, alternative to the embodiment shown in FIG. 2, cage guide paths 18 and the corresponding cage guide protrusions 19 with the inner part 12 as well as the outer part 13, can, according to the invention, be provided either only in inner part 12 or only in outer part 13.

In the displacement unit 10, there are thus between two neighboring cage guide paths 18 either two outer paths 15 that are arranged in pairs or only one outer path 15. Outer paths 15 and cage guide paths 18 are thereby in total essentially evenly distributed over the circumference of outer part 13.

Figure 3:
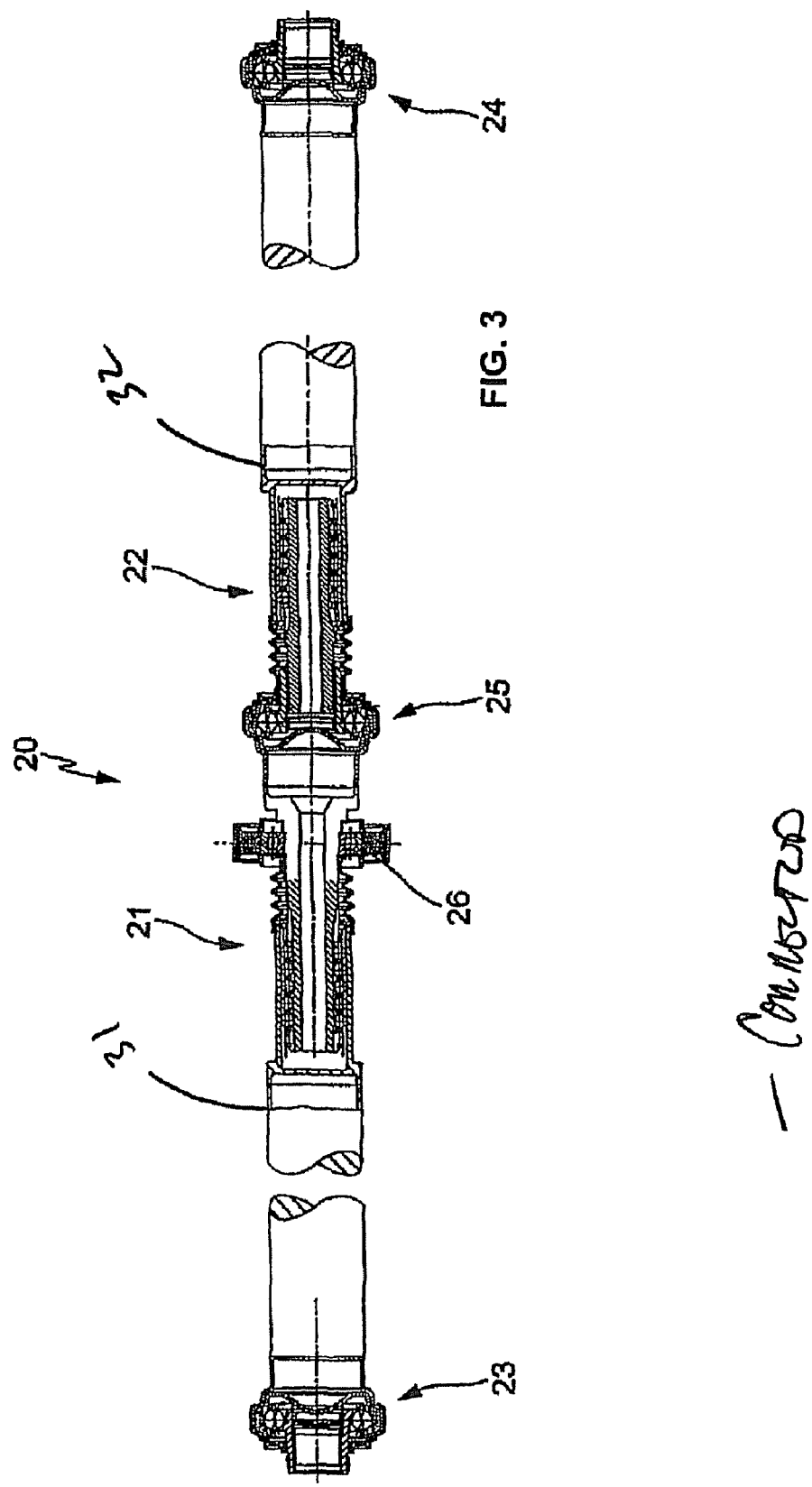

FIG. 3 shows a longitudinal shaft 20 in longitudinal cross section that is designed as a longitudinal shaft for a vehicle, which is provided with two displacement units 21 and 22 that are designed as rolling adjustments. In this FIG. 3, the universal shaft 20 is illustrated and a first flute tube 31 provided adjacent and on the left side of the intermediate bearing 26 and a second flute tube 32 provided adjacent and on the right hand side of the middle joint 25. At its end on the differential side and at its end on the gear side, the universal shaft 20 is respectively designed with a fixed joint 23 or 24 and has a middle joint 25 in the middle, which is also a fixed joint. The two rolling adjustments 21 and 22 are thereby associated with the middle joint 25, whereby the inner part of the second rolling adjustment 22 is connected with the inner race of the middle joint 25 and the inner part of the first rolling adjustment 21 is connected with the outer race of the middle joint 25. Further, the inner race of the first rolling adjustment 21 is mounted in an intermediate bearing 26 which can, for example be hung resiliently on the bottom of a vehicle.

The outer parts of the two roller balances 21 and 22 are connected with tubular shafts which are attached to the outer race of joint 23, 24 on the side of the gear or on the differential side. The universal shaft 20 is thereby formed by three fixed joints and two roller balances which are associated with the middle joint 25. The axially required displacement paths of universal shaft 20 in operation and particularly during assembly can only be accepted by roller balances 21 and 22.

The invention claimed is:

1. A displacement unit comprising:
   a tubular outer part on an inner surface of which outer paths are provided at least in sections,
   an inner part that is displaceable in the tubular outer part in axial direction, on whose exterior surface inner paths are provided at least in sections, and
   a plurality of balls that are guided in a cage, the balls respectively located in outer paths and inner paths that are associated with each other in pairs for transmitting torque,
   whereby the tubular outer part and/or the inner part is provided with cage guide paths between at least some of the exterior paths or inner paths for axial guiding of the cage,
   wherein a quantity of the cage guide paths is smaller than the quantity of pairs of paths that is formed by the outer paths and the inner paths
   wherein the cage is made of plastic and comprises a plurality of integral guide path protrusions, the integral guide path protrusions engaging the cage guide paths, and
   wherein the displacement unit comprises a roller balance whereby in the pairs of paths that are formed by the outer paths and the inner paths several balls are provided in an axial direction.

2. Displacement unit according to claim 1, wherein between two neighboring cage guide paths, at least two outer paths or at least two inner paths are located.

3. Displacement unit according to claim 1 wherein the cage guide paths are designed in the outer part.

4. Displacement unit according to claim 1 wherein the cage guide paths are designed in the inner part.

5. Displacement unit according to claim 1, wherein the cage guide paths have a contour differing in cross section from the contours of the outer paths and inner paths.

6. Displacement unit according to claim 1, wherein the cage guide paths have angular or rounded contours in cross section.

7. Universal shaft comprising at least one roller balance or a displacement joint according to claim 1.

8. Universal shaft according to claim 1 with at least two shaft sections that respectively have a flute tube,
   which are connected with one another by a middle joint and which have, on their ends facing away from the middle joint a joint on a side of a gear and on a differential side, respectively,
   whereby the joint on the side of the gear, the joint on the differential side and the middle joint are designed as fixed joints.

9. Universal shaft according to claim 1 with at least two shaft sections that respectively have a flute tube,
   which are connected with one another by a middle joint and which have, on their ends facing away from the middle joint a joint on a side of a gear or on a differential side,
   whereby the joint on the side of the gear, the joint on the differential side and the middle joint are designed as fixed joints
   wherein
   two roller balances are provided that are associated with the middle joint and are mounted adjacent the middle joint.

10. Universal shaft according to claim 9,
    wherein the inner part of the second roller balance is connected with an inner race of the middle joint and the inner part of the first roller balance connected with an outer race of the middle joint.

11. Universal shaft according to claim 9,
    wherein the inner part of a roller balance, particularly of the first roller balance is mounted in an intermediate bearing.

* * * * *